United States Patent Office 3,451,665
Patented June 24, 1969

3,451,665
PROCESS FOR THE PRODUCTION OF A LOW ALKALI CONTENT CEMENT
Heinrich Zur Strassen, Rheingaustrasse 126, Wiesbaden-Biebrich, Germany
Filed Aug. 30, 1965, Ser. No. 483,468
Claims priority, application Germany, Aug. 31, 1964, D 45,314
Int. Cl. C04b 7/44
U.S. Cl. 263—53                        9 Claims

ABSTRACT OF THE DISCLOSURE

The process of producing cement of a low alkali content according to this invention is a two-stage process wherein the cement raw material is calcined in a first firing stage under conditions, whereby no alkali is evaporated, and is sintered in a second firing stage. Only the waste gases of the second firing stage contain alkali and are freed therefrom by heat exchange with cement raw material in such a manner that the waste gases are cooled and the alkali therein is condensed but is not precipitated on the preheated cement raw material. The waste gases containing the condensed alkali are freed from said alkali after leaving the heat exchange zone. The substantially alkali-free, preheated cement raw material is either calcined or directly sintered.

---

Figure 1:
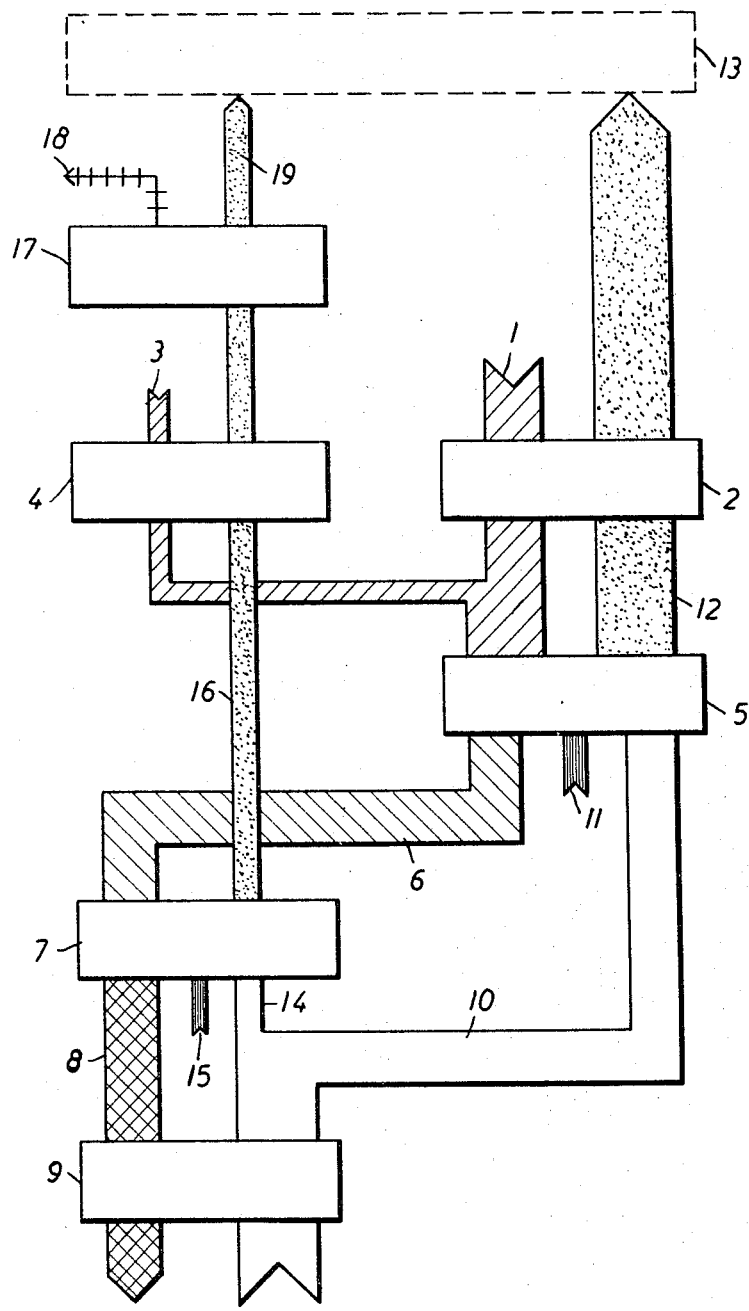

This invention relates to a process for the production of a low alkali content cement.

It is known that an elevated content of alkalines in the raw materials used for cement production has a detrimental effect on both the quality of the clinker and the course of the firing or calcination process. Part of the alkalines evaporates in the sintering zone, is entrained by the gas stream, condensed to form solid alkali metal sulfate and alkali metal chloride, chiefly in the preheater for the raw powder where the gas intimately contacts the cooler raw powder or meal, and travels back with the latter to the sintering zone. Upon renewed volatilization of part of the alkali metal salt, there is established a cycle which will not reach a stationary equilibrium until that portion of the circulating amount of alkali which is discharged with the clinker is exactly as high as the amount primarily introduced with the raw powder and the fuel. Due to the fact that the alkali metal salts melt readily, the enrichment in the cycle leads to ring formation in the kiln and plugged in the preheater and may enforce shutdown of the kiln. Particularly troublesome are the chlorides because they are most volatile and evaporated quantitatively at the sintering temperature. Since they are again condensed substantially quantitatively in a suspension-type preheater, concentrations up to 100 times the amount introduced have been observed, these concentrations giving rise to serious breakdown of the unit despite the very low initial content. Also disadvantageous although not as serious as the problem of breakdown is the fact that evaporation and dissociation heat must be constantly expended in the sintering zone for the alkali metal salts circulating in the internal cycle, this heat being only released in the preheater for the raw meal where it can no longer be completely utilized.

Various proposals have been made to eliminate the troublesome cycles by either withdrawing part of the gas before the kiln gas enters into the preheater or by separating the volatile alkali metal salt from the gas by cooling and condensation on a fine-grained cold solid. Both methods involve an additional heat loss.

It is an object of the present invention to eliminate disturbing alkali cycles and, if necessary, to reduce the alkali content in the clinker at will without having to put up with heat losses. The invention is preferably intended for kilns operating with preheating of the dust-like raw meal while suspended by the waste gases of the kiln, but is also applicable advantageously to other calcining systems in dry or wet processes where intimate contacting between the raw material and the waste gases of the kiln takes place.

The invention is based on the fact that, in cement production from limestone raw meal, the large amounts of endothermal heat are to be used for limestone dissociation and, if necessary, evaporation of water in the temperature range of below 900° C. where the alkalies contained in the raw meal are not yet volatilized while a relatively low expense of heat is required for further heating the calcined raw meal to the sintering temperature, which heating involves evaporation of part of the alkali. In accordance with the invention, the establishment of an alkali cycle can be completely avoided even in case of high volatility of the alkalies by carrying out the two firing processes, i.e., the calcination taking place substantially below 900° C. and the subsequent heating to the sintering temperature at 1300–1500° C., in separate kilns with separate firing systems and quantitatively removing from the system the waste gases of the sintering kiln which are loaded with the volatile alkalies.

For the first firing stage, i.e., the calcination process, the portion of fuel required is in the order of magnitude of two thirds for the dry process and from three quarters to four fifths of the total amount for the wet process. The amount of waste gas is still increased by the gases released from the raw meal in the firing process so that the waste gases of the first calcination step in the dry process account for about three quarters of the total amount of waste gas and correspondingly more in the wet process. These waste gases of the first firing stage are substantially free from volatile alkalies. They may deliver their heat contents to the raw meal in preheaters of any design. The dust precipitated in a dust-collecting equipment is completely returned to the raw meal.

The sensible heat of the alkali-containing waste gases of the second firing stage must also be utilized for preheating a corresponding portion of the raw meal. This is effected by methods known per se and involving no or only minor contacting between the waste gas and the raw material as will be discussed hereafter. As was mentioned above, the amount of gas which is subjected to this special treatment is only one fourth of the total amount of waste gas in the dry process and contains the volatile alkalies in a fourfold enrichment or concentration. The gases are cooled by the heat exchange to a temperature sufficiently low that the condensed alkali metal salts can be separated as high alkali content dust in a dust-collecting unit and removed from the system. The purified gases may, if desired, be put to any further use in the process.

Figure 2:
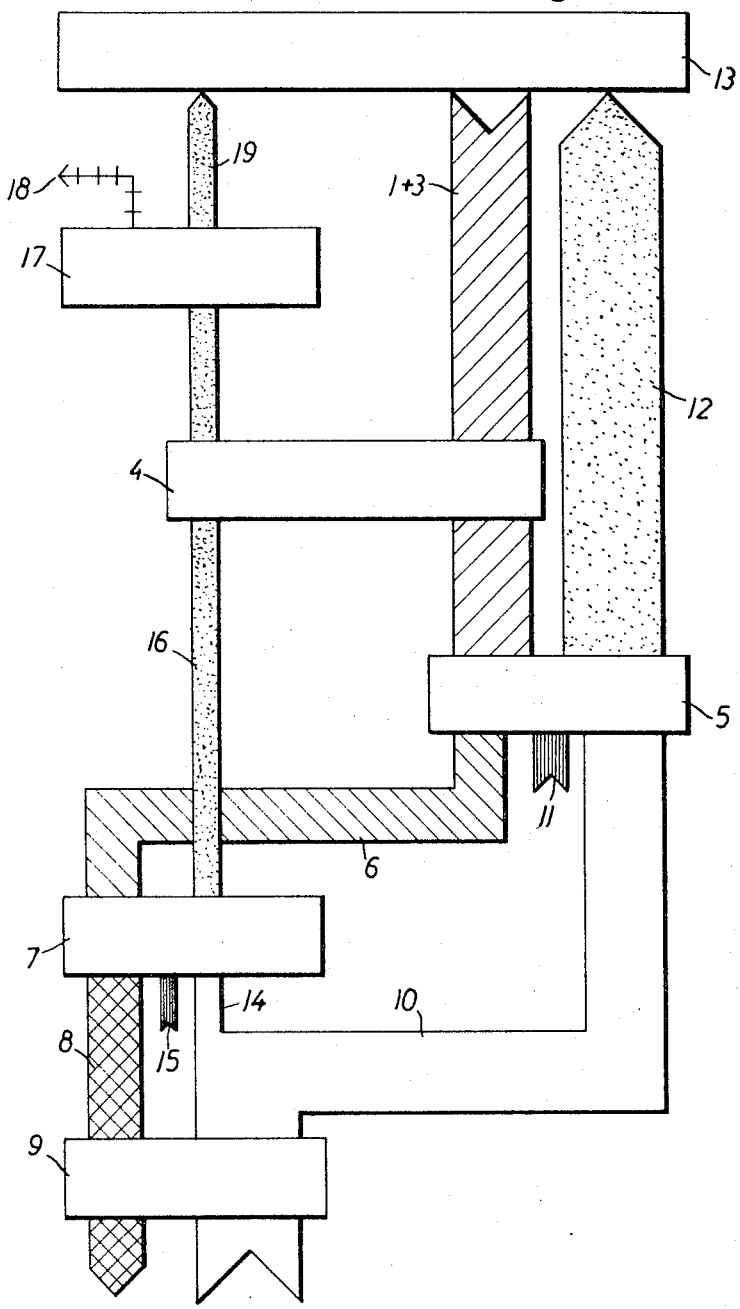
Figure 3:
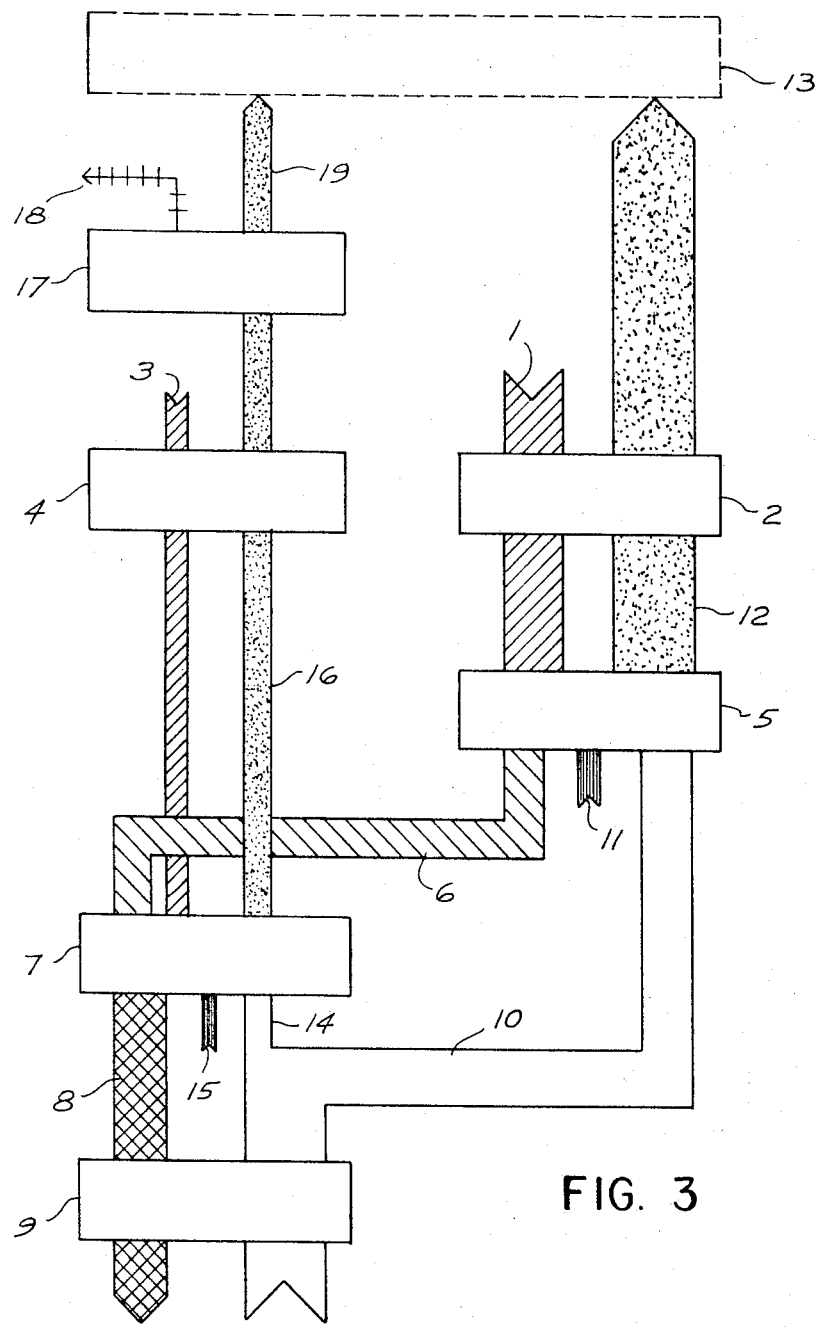

For a fuller understanding of the nature and objects of the invention reference is made to the following more detailed description taken in connection with the drawings wherein:

FIG. 1 illustrates diagrammatically the manner in which the dry process of producing cement of a low alkali content is carried out, while FIG. 2 illustrates diagrammatically the manner in which the wet process is carried out and FIG. 3 illustrates diagrammatically a modification of the process illustrated in FIG. 1.

In these figures like reference numerals indicate like stages and product streams of the process.

FIG. 1 of the drawing attached hereto illustrates diagrammatically and by way of example the course of the dry process without dealing with specific embodiments of the individual process steps which will be discussed later. In the diagram, the stream of material passes in downward direction and the gas stream in upward direction, the widths of the streams giving some indication about the relative proportions. The main stream of the raw meal 1 is heated up by the alkali-free waste gas from the first firing stage in a heat exchanger 2 of any design. Before entering this firing stage, the stream is combined with the smaller amount of raw meal 3 which has been preheated in the separate heat exchanger 4 by the alkali-containing waste gas from the second firing stage. The entire amount of raw meal is calcined in the first firing stage 5 while delivering the carbon dioxide to the gas stream. The calcined raw meal 6 passes through the second firing stage 7 where sintering to form clinker 8 is completed.

The clincker is cooled in usual manner with air in the clinker cooler 9. About two thirds of the heated combustion air 10 are passed together with the fuel 11 to the first firing stage 5. The waste gas the amount of which is increased by the carbon dioxide of the raw meal passes through the heat exchanger 2 and delivers the remainder of its heat for the drying of the raw material 13. The remaining one third of the air 14, preferably the hottest portion, is used with the appropriate amount of fuel 15 to fire the second firing stage 7. The alkali-containing waste gas 16 passes through the heat exchanger 4 and the dust-collecting unit 17 in which the dust rich in alkali 18 is separated. As shown in the drawing, the purified waste gas 19 is also passed to the drying unit 13. Since it contains no longer alkali, it may instead be used, for example, for the preheating of the raw meal 3 in a high intensity heat exchanger.

The general process diagram may be modified depending upon the conditions and the effect desired. The raw meal partial stream 3 may be passed from heat exchanger 4 for alkali-containing waste gas directly into the second firing stage 7 as illustrated in FIG. 3. This may be advantageous with respect to the arrangement of the apparatus but is less favorable from the viewpoint of heat economy than the route represented in FIG. 1 via the first firing stage 5 and, moreover, results in a greater amount of alkali-containing waste gas.

If it is not necessary to eliminate an alkali cycle completely, there is the possibility of a fractional separation of the dust in the dust-collecting unit 17 and of the removal of only those portions from the system which are highest in alkali. As an alternative, it is possible to use a heat exchanger 4 in which the separation of the condensed alkali metal salts in the raw meal entrained by the waste gas is not prevented so extensively as initially contemplated. Instead of the total amount, only part of the alkali-containing waste gas 16 may be passed the separate route via the heat exchanger 4 and the dust-collecting unit 17 while the balance 16 of the gas, for utilization of its sensible heat, is combined with the alkali-free waste gas 12 in the first firing stage 5 or in the heat exchanger 2 upstream thereof. This arrangement permits a reduction in the dimensions of the separate units 4 and 17. It remains essential for these variants that the cycles which develop should not be allowed to become so high that they lead to breakdown of the process.

If it is desired to reduce the alkali content in the clinker as far as possible, the volatilization of alkalies in the second firing stage is promoted by means known per se, e.g., by addition of calcium chloride to the raw meal or of steam to the combustion air. Measures of this kind were incapable so far of being successful because increased volatilization in the sintering zone of heat-economizing kilns resulted in an increased alkali cycle which more or less annulled the effect of the volatilization.

In the wet process, the raw slurry must first be converted into dry material in order that all advantages of the invention can be utilized. As compared with the dry process, the procedure is simplified by the fact that the waste gas heat of the alkali-free waste gas is required directly for the slurry drying. In the flow diagram of the process (FIG. 2), the slurry dryer is substituted for the raw material dryer 13. In contrast to the dry process, the entire dried material (1 and 3) then passes through the heat exchanger 4 for alkali-containing waste gas and thereafter enters the first firing stage 5. The waste gases 12 of the first firing stage pass directly to the slurry dryer 13 where the waste gases 19 freed from alkali dust are also utilized. The remainder of the process diagram is unchanged.

Additional advantages of the process of the invention become obvious when discussing the design of the equipment of the individual process steps.

For the first firing stage or calcination 5, rotary kilns of conventional design may be used which are fired with fuel in an amount sufficiently low that the raw meal is heated to a temperature which is not higher than necessary for the completion of the calcination.

The function of the first firing stage, i.e., transfer of a large amount of heat at a relatively low temperature, can be performed more economically by dispensing with the rotary kiln and feeding the fuel required directly to the raw meal preheater. Combustion may be effected in a hot gas producer upstream of the preheater or in a particularly advantageous manner by flameless combustion. In case of a suspension-type preheater, the fuel is injected into the hottest stage of the preheater, which stage is designed as combustion chamber where it is ignited at the material being calcined and heated to the dissociation temperature. The combustion heat is transferred instantaneously to this material and utilized for further dissociation so that the temperature does not increase substantially beyond the dissociation temperature.

If a traveling grate is used as the preheater, it is desirable to charge the feed in two layers (the lower layer consisting of fresh granules and the upper layer of preheated granules). Firing is possible by means of hot gas or by direct fuel supply. Greatest uniformity of calcination is achieved if, provided that the granules are sufficiently durable, a fluidized bed chamber is arranged downstream of the traveling grate and the fuel is burnt in the fluidized bed in contact with the granules.

The rotary kiln is a very useful firing apparatus for the second firing stage 7. Since it is released from two thirds of the combustion capacity of the rotary kiln operated in a one-stage calcination process, the throughput of the kiln increases extraordinarily. The specific space efficiency rises to about three times its original value and the specific wall heat losses and the investment cost are reduced correspondingly. Apart from the rotary kiln, use of a fluidized bed kiln is also favorable. When effecting the calcination process in the fluidized bed, the alkalies are largely driven out. However, it was just this fact why economical utilization of the waste gas heat was not possible so far because very high alkali cycles would have developed in case of intensive heat exchange.

For the heat exchange of the alkali-containing waste gas 4 of the second firing stage in countercurrent flow relation with a partial stream 3 of the raw meal, a simple rotary tube is very well suited. The gas is predominantly cooled by radiation and the raw meal hardly takes up alkali. At about 700° C., substantially all of the alkali is condensed within the gas phase with substantially all of this alkali being in the solid state of aggregation. The dimensions of the rotary tube are desirably selected such that the waste gas is cooled down at least sufficiently that the dust rich in alkali can be separated in a dust removal unit.

If the raw meal is present in the form of granules, the heat exchange of the waste gas of the second firing stage, similar to the first firing stage, can be carried out on a traveling grate. It is known in the single-stage calcining process to separate the alkali-enriched dust in the intermediate and final dust removal unit. In doing so, a substantial portion of the alkali metal salts is retained by the granules and returned into the alkali cycle and many attempts are made to reduce this amount, e.g., by uniform size of the granules, reduction in layer depth, restriction to once-through passage of the gas through the bed of granules (the second passage being replaced by predrying with waste air from the cooler), screening of the granules after having left the grate.

All measures will desirably be also taken in case of the two-stage firing process of the invention to keep as low as possible the portion of alkalies retained by the traveling grate. However, this process has the advantage over the prior art process that the alkalies are present in the gas and in the dust in a fourfold concentration and may be separated with a correspondingly higher yield and that special measures to increase the degree of separation are restricted to one quarter of the total amount.

In place of the direct heat exchange between the waste gas and raw meal as being exclusively practiced today, cooling of the alkali-containing waste gases of the second firing stage may also be effected advantageously by indirect heat exchange which avoids entirely the contact with the raw meal. According to a long known process, the waste gases of the kiln transfer their heat to a tubular system through which the raw meal is blown pneumatically in countercurrent to the gas direction. The heat transfer is so excellent that the temperature of the raw meal may rise to more than 700° C. Application of indirect heat exchange to the process of the invention also has the advantage that the sufrace area of the heat exchanger needs only be dimensioned on the basis of one fourth of the total waste gas quantity. The preheated raw meal is desirably passed on through the same conduit directly into the first firing stage.

Several methods are available for slurry drying in the wet process. However, spray drying of the raw slurry by means of the hot waste gases can be incorporated particularly advantageously in the remainder of the process. This requires two series-connected reaction towers, both of which are provided with cyclone separators for the finished product. The raw slurry is injected into the drying tower which corresponds to the raw slurry dryer 13. The fuel 11 and hot air 10 from the clinker cooler are injected into the calcining tower which corresponds to the first firing or calcining stage 5. The fine-grained material obtained in the drying tower is blown pneumatically, e.g., by means of a dust-conveying pump, through a tubular system in which it is preheated indirectly by the alkali-containing waste gases of the second firing stage and is then further conveyed into the calcining tower 5. Here, it is heated to the dissociation temperature by flameless combustion while being in suspended state and calcined. Due to the small particle size, all mass and heat transfers of combustion, calcination and drying in suspension proceed very rapidly and at a high efficiency and require relatively small reaction spaces.

Indirect preheating of the raw meal still permits the variant that the raw meal is mixed with finely ground solid fuel which is thus injected into the first firing stage while being heated to a high temperature and intimately mixed with the material to be calcined. In the dry process, the total amount of the fuel can only be premixed or ground with that particle stream 3 of the raw meal which passes through the indirect heat exchanger 4 unless the heat exchange 2 of the waste gas 12 of the first firing stage is also effected indirectly. However, in view of the large heat exchange surfaces required, this will be economical only in exceptional cases. In contrast hereto, in the wet process, the fuel is always admixed with the total amount of raw meal. If there is no risk that the fuel will ignite in the drying process, it may be ground wet together with the raw slurry. Otherwise it will be dried separately and admixed with the dry meal.

These possibilities are particularly interesting in those cases where very low grade fuels such as waste washings of coal may be burnt or the raw material itself contains fuel such as oil shale. Of course, low-grade fuels may also be burnt without preheating in the first firing stage if the ash content is not too high, but ignition is delayed in this case. At any rate, care must tbe taken when using solid fuels that the residence time in the combustion chamber is suffiicent for complete combustion.

The heat exchange of granulated raw meal with alkali-containing waste gas on a traveling grate can still be utilized in a particular manner for the reduction of the alkali content in the finished clinker. As already mentioned, it is among the known measures for the reduction of the separation of alkali metal salts on the grate to suck the kiln waste gas only in once-through passage through the grate and to effect predrying of the moist granules with hot waste air from the cooler. In accordance with the invention, the steam-enriched air from the predrying step of the granules is blown again through the clinker bed at its hottest spot as combustion air for the second firing stage. In doing so, the steam-containing air which is heated to a high temperature promotes in known manner the volatilizaiton of the alkalies from the clinker.

What is claimed is:

1. In a process of producing cement of a low alkali content from cement raw material, said process comprising the steps of
    (a) calcining at least part of the raw material in a first firing stage,
    (b) sintering the resulting calcined material in a second firing stage, and
    (c) recovering the alkali from the waste gases, the improvement which consists in
        (1) calcining at least part of the cement raw material in the first firing stage (a) at a temperature substantially below 900° C., whereby substantially no alkali is evaporated during calcination,
        (2) conducting at least part of the waste gases from the second firing stage (b) through a first heat exchange zone countercurrently to at least part of the cement raw material without substantially contacting said cement raw material, thereby preheating the cement raw material and cooling the waste gases so as to condense the alkali contained in said waste gases, and
        (3) separating the condensed alkali from the waste gases after their discharge from the first heat exchange zone.

2. The process as claimed in claim 1, wherein part of the cement raw material is preheated before calcination by the alkali-free waste gases from said first firing stage (a) in a second heat exchange zone and wherein the preheated part of the cement raw material is introduced into the first firing stage (a) together with the part of the cement raw material preheated in the first heat exchange zone by the alkali-containing waste gas from the second firing stage.

3. The process as claimed in claim 1, wherein part of the cement raw material preheated in the first heat exchange zone is introduced directly and without prior calcination into the second firing stage (b).

4. The process as claimed in claim 1, wherein the cement raw material is in the form of an aqueous slurry, wherein said slurry is dried by the alkali-free waste gases of the first calcining stage (a), wherein the waste gases from the second firing stage (b) are conducted through the first heat exchange zone counter-currently to the dried slurry of cement raw material, thereby preheating said dried slurry and cooling said waste gases from the second firing stage (b) to condense the alkali contained therein, and wherein the preheated dried slurry is then calcined in the first calcining stage (a).

5. The process as claimed in claim 1, wherein the alkali-containing waste gases from the second firing stage (b)

are indirectly cooled in the first heat exchange zone by the cement raw material passing countercurrently through the first heat exchange zone.

6. The process as claimed in claim 1, wherein the alkali-containing waste gases from the second firing stage (b) are cooled essentially by radiation by heat exchange with a bed of cement raw material passing countercurrently to said waste gases through the first heat exchange zone.

7. The process as claimed in claim 6, wherein the alkali-containing waste gases from the second firing stage (b) are cooled by passing through a bed of substantially uniformly granulated cement raw material.

8. The process as claimed in claim 1, wherein calcination in the first firing stage (a) is effected by flameless combustion in the cement raw material.

9. The process as claimed in claim 1, wherein solid fuel is admixed to the cement raw material before preheating in the first heat exchange zone.

References Cited

UNITED STATES PATENTS

| | | | |
|---|---|---|---|
| 2,214,345 | 9/1940 | Pike | 263—53 |
| 3,212,764 | 10/1965 | Muller et al. | 263—53 X |
| 3,288,450 | 11/1966 | Bade | 263—32 |
| 3,317,201 | 5/1967 | Muller et al. | 263—53 |

JOHN J. CAMBY, *Primary Examiner.*

U.S. Cl. X.R.

106—100